US008787257B2

(12) United States Patent
Fujita

(10) Patent No.: US 8,787,257 B2
(45) Date of Patent: Jul. 22, 2014

(54) NETWORK COMMUNICATION SYSTEM, NODE DEVICE, ROUTING METHOD AND ROUTING PROGRAM

(75) Inventor: Norihito Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 504 days.

(21) Appl. No.: 13/119,051

(22) PCT Filed: Aug. 18, 2009

(86) PCT No.: PCT/JP2009/003935
§ 371 (c)(1),
(2), (4) Date: Mar. 15, 2011

(87) PCT Pub. No.: WO2010/047024
PCT Pub. Date: Apr. 29, 2010

(65) Prior Publication Data
US 2011/0211535 A1    Sep. 1, 2011

(30) Foreign Application Priority Data

Oct. 23, 2008  (JP) ................................. 2008-273134

(51) Int. Cl.
*H04W 40/00*    (2009.01)
(52) U.S. Cl.
USPC ........... 370/328; 370/238; 370/338; 370/315; 370/392; 370/252
(58) Field of Classification Search
CPC ..... H04W 40/00; H04W 80/04; H04W 88/06; H04L 45/00; H04L 45/12; H04L 45/02
USPC ......... 370/328, 338, 315, 238, 400, 392, 252, 370/235, 229, 412, 230
See application file for complete search history.

(56) References Cited

FOREIGN PATENT DOCUMENTS

WO    2009078427 A    6/2009

OTHER PUBLICATIONS

International Search Report for PCT/JP2009/003935 mailed Oct. 6, 2009.
A. Lindgren et al., "Probabilistic Routing in Intermittently Connected Networks", In Proceedings of the First International Workshop on Service Assurance with Partial and Intermittent Resources (SAPIR 2004), Aug. 2004.
K. Scott et al., "Routing in Networks with Random Topologies" IEEE, ICC 1997 Towards the Knowledge Millennium, vol. 2, 1997, pp. 862-866.
R. R. Brooks et al., "Mobile Network Analysis Using Probabilistic Connectivity Matrices", IEEE Transactions on Systems, Man, and Cybernetics—Part C. Applications and Reviews, vol. 37, No. 4, Jul. 2007, pp. 694-702.
Krishnamachari et al., "Phase Transition Phenomena in Wireless Ad Hoc Networks", IEEE; Globecom, vol. 5. 2001, pp. 2921-2925.

*Primary Examiner* — Jamal Javaid
(74) *Attorney, Agent, or Firm* — Sughrue Mion, PLLC

(57) ABSTRACT

Each of nodes A through Z calculates delivery predictability for a destination node and exchanges the delivery predictability as an SV message with an adjacent node. At this time, the delivery predictability calculated in each of the nodes A through Z is transmitted together with a next hop node for the destination node. Upon receiving the delivery predictability for the destination node and the next hop node for the destination node, each of the nodes A through Z checks whether or not the next hop node matches the local node itself, wherein whey they match with each other, the delivery predictability is not registered with a delivery predictability database. Since the node transmitting the delivery predictability is not selected as the next hop node for the destination node, it is possible to prevent the occurrence of a routing loop between nodes.

3 Claims, 12 Drawing Sheets

FIG. 3A

162a DELIVERY PREDICTABILITY DATABASE
(DELIVERY PREDICTABILITY CALCULATED BY LOCAL NODE)

| DESTINATION NODE | DELIVERY PREDICTABILITY |
|---|---|
| X | 0.6 |
| Y | 0.2 |
| Z | 0.3 |
| ... | ... |

FIG. 3B

162b DELIVERY PREDICTABILITY DATABASE
(DELIVERY PREDICTABILITY RECEIVED FROM ANOTHER NODE)

| DISTINATION NODE | DELIVERY PREDICTABILITY | NODE OF CALCULATION | VALID TIME LIMIT |
|---|---|---|---|
| X | 0.4 | B | 2008/8/18 17:10:49.500 |
| X | 0.1 | C | 2008/8/18 17:11:10.000 |
| Y | 0.5 | C | 2008/8/18 17:12:20.000 |
| W | 0.8 | B | 2008/8/18 17:11:55.000 |
| W | 0.3 | C | 2008/8/18 17:10:30.500 |
| ... | ... | ... | ... |

FIG. 4

152 ROUTING TABLE

| DESTINATION NODE | NEXT HOP NODE | NEXT HOP IP ADDRESS |
|---|---|---|
| X | A | 10.0.0.1 |
| Y | C | 10.0.0.3 |
| Z | A | 10.0.0.1 |
| W | B | 10.0.0.2 |
| ... | ... | ... |

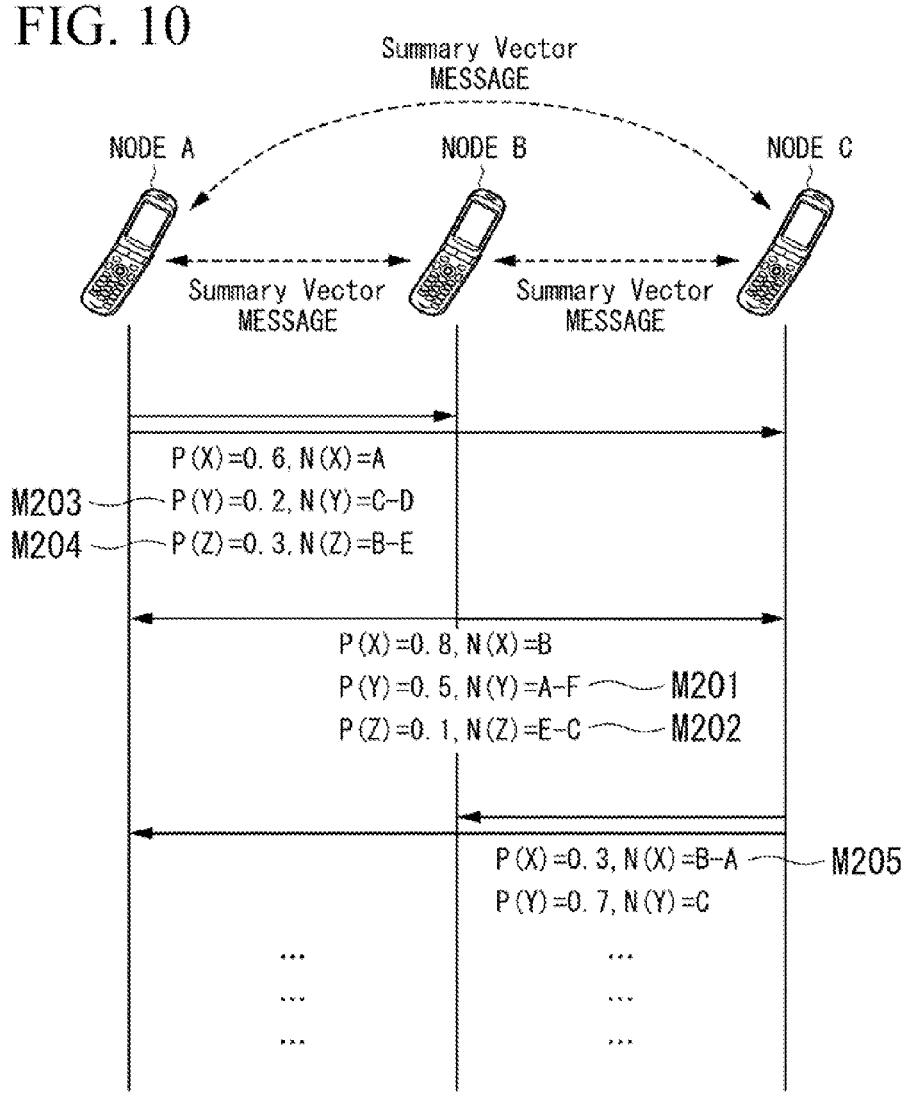

NETWORK COMMUNICATION SYSTEM, NODE DEVICE, ROUTING METHOD AND ROUTING PROGRAM

The present application is the National Phase of PCT/JP2009/003935, filed Aug. 18, 2009, which claims priority on Japanese Patent Application No. 2008-273134 filed in Japan on Oct. 23, 2008, the content of which is incorporated herein by reference.

TECHNICAL FIELD

The present invention relates to network communication systems in which paths for transmitting data to destination nodes are determined based on delivery predictability toward destination nodes calculated by local nodes and adjacent nodes and also relates to node devices, routing methods and routing programs used in network communication systems.

BACKGROUND ART

In conventionally-known mobile multi-hop networks such as DTN and ad hoc networks, paths from source nodes to destination nodes cannot be fixed due to movements of nodes so that they need to be timely optimized based on node allocations in each data transmit mode. Ad hoc networks having relatively dense distributions of nodes and easily forming direct end-to-end paths may generally adopt MANET (Mobile Adhoc NETwork) routing protocols such as AODV (Ad Hoc On Demand Distance Vector algorithm) and OLSR (Optimized Link State Routing protocol).

DTN refers to network systems guaranteeing highly reliable end-to-end transmission of data/contents in wireless ad hoc networks and satellite lines having unstable and low-reliable internode connectivity. In DTN, transmission data are subdivided into units of data sizes referred to as bundles, so that transmission processes toward destination nodes are performed in units of bundles. As the most significant feature of DTN, it is possible to point out a feature in which bundles are not discarded but accumulated until next hops of transmission are found in a standby state. According to this procedure, bundles are temporarily transmitted to intermediate nodes and thereafter retransmitted upon establishing paths toward destination nodes in networks having sparse distributions of nodes in which end-to-end paths from source nodes to destination nodes cannot be concurrently established, thus achieving results of improving transport factors toward destination nodes.

Therefore, the path control method of DTN adopts a different method compared to the conventional IP routing for searching end-to-end paths from source nodes to destination nodes.

One representative method regarding the DTN routing is disclosed in Non-Patent Document 1 and referred to as PROPHET which is a routing method based on delivery predictability toward destination nodes.

Referring to Non-Patent Document 1, the method referred to as PROPHET is explained.

PROPHET is designed to perform routing based on delivery predictability toward destination nodes. Specifically, when a certain node A adjoins another node B, the node A updates a delivery predictability P_i for the node B according to the following equation.

$$P\_i = P\_(i-1) + (1 - P\_(i-1)) * P\_init (0 < P\_init < 1)$$

where P_(i−1) denotes a delivery predictability of the node A for the node B, and P_init denotes an initialization constant.

As long as the situation in which the node A does not adjoin the node B remains, the delivery predictability is periodically updated and decreased by way of an aging method according to the following equation.

$$P\_i = P\_(i-1) * \gamma^k (0 < \gamma 1)$$

where γ denotes the number of times each unit time has passed after the last time at which the node A adjoins the node B.

When each node has a bundle destined to a certain node, it exchanges the delivery predictability P_i for the destined node with an adjacent node, thus transferring the bundle to the adjacent node having the highest delivery predictability. When the delivery predictability of a certain local node for a destination node is lower than the delivery predictability of an adjacent node for the destination node, the local node does not transfer the bundle thereof to the adjacent node but retains it therein.

As described above, PROPHET is designed to perform routing through high/low comparison of delivery predictabilities for designation nodes calculated based on adjacency records.

Patent Document 1 discloses a method in which delivery predictabilities are calculated based on adjacency records whilst delivery predictabilities for destination nodes are calculated based on records of end-to-end paths for destination nodes, counted from the past to the present, which have been already registered with routing tables of nodes. As described above, it is possible to expand PROPHET such that delivery predictabilities embrace values calculated based on adjacency records as well as values calculated based on other parameters disclosed in Patent Document 1.

PRIOR ART DOCUMENT

Patent Document

Patent Document 1: Japanese Patent Application No. 2007-324563

Non-Patent Document

Non-Patent Document 1: Anders Lindgren, Avri Doria, Olv Schelen, "Probabilistic Routing in Intermittently Connected Networks", In Proceedings of The First International Workshop on Service Assurance with Partial and Intermittent Resources (SAPIR 2004), August 2004, Fortaleza, Brazil.

SUMMARY OF THE INVENTION

Problem to be Solved by the Invention

The PROPHET periodically calculates delivery predictabilities for other nodes so as to exchange a list of delivery predictabilities with adjacent nodes. Upon the occurrence of bundles which need to be transmitted, the PROPHET refers to delivery predictabilities of bundles for a destination node so as to transfer bundles to an adjacent node having the highest delivery predictability.

In the procedure, however, upon a loss of a message conveying delivery predictability to an adjacent node, coherence regarding the high/low relationship of delivery predictabilities with adjacent nodes is lost so that a routing loop temporarily occurs. A specific example regarding the occurrence of a routing loop will be described with reference to FIG. 14.

FIG. 14 shows nodes A and B which adjoin together. The nodes A and B periodically calculate delivery predictabilities for other nodes so as to transmit calculated delivery predictabilities to adjacent nodes. Herein, a message conveying delivery predictabilities refers to a Summary Vector message (hereinafter, referred to as an SV message), wherein delivery predictability for a node X, which denotes another node other than the nodes A and B, is calculated and transmitted.

In an initial state, at time T0, the node A calculates delivery predictability of "0.7" for the node X, wherein the node A has not received delivery predictabilities from other nodes. Therefore, at time T0, a next hop which the node A adopts to transmit bundles to the node X is set to the node A.

At time T0, the node B calculates delivery predictability of "0.5" for the node X, wherein the node B has not received delivery predictabilities from other nodes. Therefore, at time T0, a next hop which the node B adopts to transmit bundles to the node X is set to the node B.

Next, at time T1, the node A recalculates delivery predictability for the node X so as to update it from "0.7" to "0.6". The updated delivery predictability will be immediately broadcast to adjacent nodes including the node B by way of an SV message (i.e. a message M301).

At time T1 when the node B receives the updated delivery predictability for the node X from the node A, the node B registers the received delivery predictability whose value is "0.6" together with the name of the node A transmitting the delivery predictability. That is, the node B registers "0.6(A)" therein as shown in FIG. 14. Simultaneously, the node B compares the calculated delivery predictability of "0.5" with the received delivery predictability of "0.6", wherein "0.6" is higher so that the node B sets a next hop for the node X as the node A transmitting the higher delivery predictability.

Next, at time T2, the node B recalculates delivery predictability for the node X so as to update it from "0.5" to "0.4". After updating, the node B compares the calculated delivery predictability of "0.4" with the received delivery predictability of "0.6", wherein "0.6" is higher so that the node A still remains as the next hop for the node X. The updated delivery predictability will be immediately broadcast to adjacent nodes including the node A by way of an SV message (i.e. a message M302).

At time T2 when the node A receives the updated delivery predictability for the node X from the node B, the node A registers the received delivery predictability of "0.4" together with the name of the node B transmitting the delivery predictability. That is, the node A registers "0.4(B)" therein as shown in FIG. 14. Simultaneously, the node A compares the calculated delivery predictability of "0.6" with the received delivery predictability of "0.4", wherein "0.6" is higher so that the node A still remains as the next hop for the node X.

Next, at time T3, the node A recalculates delivery predictability for the node X so as to update it from "0.6" to "0.2". After updating, the node A compares the calculated delivery predictability of "0.2" with the received delivery predictability of "0.4", wherein "0.4" is higher so that the node A sets the next hop for the node X as the node B transmitting the higher delivery predictability. Similar to the foregoing procedure at time T1, the node A broadcasts the updated delivery predictability by way of an SV message (i.e. a message M303). However, the node B fails to receive the SV message due to some cause. This cause may refer to a packet loss due to a wireless communication error or a buffer overflow due to congestion.

At time T3, when the node B fails to receive the SV message output from the node A, no change occurs in the status of the node B so that the node A still remains as the next hop for the node X.

At time T3 and onwards, the node A registers the node B as the next hop for the node X, whilst the node B registers the node A as the next hop for the node X. In this situation, when bundles addressing the node X occur in one of the nodes A and B, those bundles may repeatedly reciprocate between the nodes A and B, thus causing a loop status.

Next, at time T4, the node B recalculates delivery predictability for the node X so as to update it from "0.4" to "0.3". After updating, the node B compares the calculated delivery predictability of "0.3" with the received delivery predictability of "0.6", wherein "0.6" is higher so that the node A still remains as the next hop for the node X. The updated delivery predictability will be immediately broadcast to adjacent nodes including the node A by way of an SV message (i.e. a message M304).

At time T4 when the node A receives the updated delivery predictability for the node X from the node B, the node A registers the received delivery predictability of "0.3" together with the name of the node B transmitting the delivery predictability. That is, the node A registers "0.3(B)" therein as shown in FIG. 14. Simultaneously, the node A compares the calculated delivery predictability of "0.2" with the received delivery predictability of "0.3", wherein "0.3" is higher so that the node B still remains as the next hop for the node X.

Next, at time T5, the node A recalculates delivery predictability for the node X so as to update it from "0.2" to "0.1". After updating, the node A compares the calculated delivery predictability of "0.1" with the received delivery predictability of "0.3", wherein "0.3" is higher so that the node B still remains as the next hop for the node X. The node A broadcasts the updated delivery predictability by way of an SV message (i.e. a message M305). The node B is able to normally receive the SV message which is transmitted at time T5.

At time T5 when the node B receives the updated delivery predictability for the node X from the node A, the node B registers the received delivery predictability of "0.1(A)" therein. Simultaneously, the node B compares the calculated delivery predictability of "0.3" with the received delivery predictability of "0.1", wherein "0.3" is higher so that the node B currently serving as a local node is set as the next hop for the node X. At this time, both the nodes A and B register the same name of the node B as the next hop for the node X, thus canceling a routing loop status which continues after time T3.

Therefore, the routing loop status between the nodes A and B continues from time T3 to time T5.

As described above, the conventional PROPHET suffers from a problem of a routing loop when a loss of a message conveying delivery predictability occurs.

Considering the above problem, the present invention aims at preventing the occurrence of a loop when determining paths for transmitting data based on delivery predictabilities for a destination node calculated in a local node and an adjacent node.

Means for Solving the Problem

The present invention is produced to solve the above problem, wherein the present invention is directed to a network communication system which determines a path for transmitting data to a destination node based on delivery predictabilities for the destination node calculated in a local node and an adjacent node, and wherein each of nodes constituting the network communication system includes a delivery predictability database which registers delivery predictability for the destination node calculated in the local node and delivery predictability received from the adjacent node; a delivery predictability calculation means which calculates delivery predictability for the destination node and which registers the delivery predictability for the destination node calculated in the local node with the delivery predictability database; a delivery predictability exchange means which transmits to the adjacent node the delivery predictability for the destination node calculated in the local node together with a next hop node for the destination node in the path and which receives from the adjacent node the delivery predictability for the destination node calculated in the adjacent node together with the next hop node for the destination node in the path; a delivery predictability reception decision means which makes a decision as to whether the next hop node received from the adjacent node matches the local node, which registers the received delivery predictability from the adjacent node with the delivery predictability database when the next hop node does not match the local node, and which does not register the received delivery predictability from the adjacent node with the delivery predictability database when the next hop node matches the local node; and a path calculation means which refers to the delivery predictability database registering the delivery predictability for the destination node calculated in the local node and the received delivery predictability from the adjacent node, thus setting the path toward the destination node.

In the network communication system of the present invention, the delivery predictability reception decision means is able to delete the received delivery predictability which has been already registered with the delivery predictability database when the next hop node matches the local node.

The present invention is directed to a network communication system which determines paths for transmitting data to a destination node based on delivery predictabilies for the destination node calculated in a local node and an adjacent node, wherein each of nodes constituting the network communication system includes a delivery predictability database which registers delivery predictability for the destination node calculated in the local node and delivery predictability received from the adjacent node; a delivery predictability calculation means which calculates delivery predictability for the destination node and which registers the delivery predictability for the destination node calculated in the local node with the delivery predictability database; a delivery predictability exchange means which transmits to the adjacent node the delivery predictability for the destination node calculated in the local node together with a next hop node string which is a list describing a plurality of nodes counted from the local node up to an n-th hop (where n is an integer) in a path toward the destination node and which receives from the adjacent node the delivery predictability for the destination node calculated in the adjacent node together with a next hop node string in a path toward the destination node; a delivery predictability reception decision means which makes a decision as to whether or not the local node is included in the next hop node string received from the adjacent node, which registers the received delivery predictability from the adjacent node with the delivery predictability database when the local node is not included in the next hop node string, and which does not register the received delivery predictability from the adjacent node with the delivery predictability database when the local node is included in the next hop node string; and a path calculation means which refers to the delivery predictability database storing the delivery predictability for the destination node calculated in the local node and the received delivery predictability from the adjacent node, thus setting the path toward the destination node.

In the network communication system, the delivery predictability reception decision means is able to delete the received delivery predictability which is has been already registered with the delivery predictability database when the local node is included in the next hop node string.

In the network communication system, the next hop node string is calculated according to a MANET routing protocol.

A node device of the present invention includes a delivery predictability database which registers delivery predictability for a destination node calculated in a local node and delivery predictability received from an adjacent node; a delivery predictability calculation means which calculates delivery predictability for the destination node and which registers the delivery predictability for the destination node calculated in the local node with the delivery predictability database; a delivery predictability exchange means which transmits to the adjacent node the delivery predictability for the destination node calculated in the local node together with a next hop node in a path toward the destination node and which receives from the adjacent node the delivery predictability for the destination node calculated in the adjacent node together with a next hop node in a path toward the destination node; a delivery predictability reception decision means which makes a decision as to whether or not the next hop node received from the adjacent node matches the local node, which registers the received delivery predictability from the adjacent node with the delivery predictability database when the next hop node does not match the local node, and which does not register the received delivery predictability from the adjacent node with the delivery predictability database when the next hop node matches the local node; and a path calculation means which refers to the delivery predictability database storing the delivery predictability for the destination node calculated in the local node and the received delivery predictability from the adjacent node, thus setting the path toward the destination node.

A node device of the present invention includes a delivery predictability database which registers delivery predictability for the destination node calculated in the local node and delivery predictability received from the adjacent node; a delivery predictability calculation means which calculates delivery predictability for the destination node and which registers the delivery predictability for the destination node calculated in the local node with the delivery predictability database; a delivery predictability exchange means which transmits to the adjacent node the delivery predictability for the destination node calculated in the local node together with a next hop node string which is a list describing a plurality of nodes counted from the local node up to an n-th hop (where n is an integer) in a path toward the destination node and which receives from the adjacent node the delivery predictability for the destination node calculated in the adjacent node together with a next hop node string in a path toward the destination node; a delivery predictability reception decision means which makes a decision as to whether or not the local node is included in the next hop node string received from the adjacent node, which registers the received delivery predictability from the adjacent node with the delivery predictability database when the local node is not included in the next hop node string, and which does not register the received delivery predictability from the adjacent node with the delivery predictability database when the local node is included in the next hop node string; and a path calculation means which refers to the delivery predictability database storing the delivery predictability for the destination node calculated in the local node and the received delivery predictability from the adjacent node, thus setting the path toward the destination node.

A routing method of the present invention is a routing method which determines a path for transmitting data to a destination node based on delivery predictabilities for the destination node calculated in a local node and an adjacent node, wherein the local node calculates delivery predictability for the destination node so that the delivery predictability for the destination node calculated in the local node is registered with the delivery predictability database; the local node transmits to the adjacent node the delivery predictability for the destination node calculated in the local node together with a next hop node in a path toward the destination node; the local node receives from the adjacent node the delivery predictability for the destination node calculated in the adjacent node together with a next hop node in a path toward the destination node; the local node makes a decision as to whether or not the next hop node received from the adjacent node matches the local node; the local node registers the received delivery predictability from the adjacent node with the deliver predictability database when the next hop node does not match the local node; the local node does not register the received delivery predictability from the adjacent node with the delivery predictability database when the next hop node matches the local node; and the local node refers to the delivery predictability database storing the delivery predictability for the destination node calculated in the local node and the received delivery predictability from the adjacent node, thus setting the path toward the destination node.

A routing method of the present invention is a routing method which determines a path for transmitting data to a destination node based on delivery predictabilities for the destination node calculated in a local node and an adjacent node, wherein the local node calculates delivery predictability for the destination node so that the delivery predictability for the destination node calculated in the local node is registered with a delivery predictability database; the local node transmits to the adjacent node the delivery predictability for the destination node calculated in the local node together with a next hop node string which is a list describing a plurality of nodes counted from the local node up to an n-th hop (where n is an integer) in a path toward the destination node; the local node receives from the adjacent node the delivery predictability for the destination node calculated in the adjacent node together with a next hop node string counted from the adjacent node up to an n-th hop (where n is an integer) in a path toward the destination node; the local node makes a decision as to whether or not the local node is included in the next hop node string received from the adjacent node; the local node registers the received delivery predictability from the adjacent node with the delivery predictability database when the local node is not included in the next hop node string; the local node does not register the received delivery predictability from the adjacent node with the delivery predictability database when the local node is included in the next hop node string; and the local node refers to the delivery predictability database storing the delivery predictability for the destination node calculated in the local node and the received delivery predictability from the adjacent node, thus setting the path toward the destination node.

A routing program of the present invention is a routing program which controls a computer to perform routing on a network communication system such that a path for transmitting data to a destination node is determined based on delivery predictabilities for the destination node calculated in a local node and an adjacent node, wherein the routing program includes a step for calculating delivery predictability of the local node for the destination node; a step for registering the delivery predictability for the destination node calculated in the local node with a delivery predictability database; a step for transmitting to the adjacent node the delivery predictability for the destination node calculated in the local node together with a next hop node in a path toward the destination node; a step for receiving from the adjacent node the delivery predictability for the destination node calculated in the adjacent node and a next hop node in a path toward the destination node; a step for making a decision as to whether or not the next hop node received from the adjacent node matches the local node; a step for registering the received delivery predictability from the adjacent node with the delivery predictability database when the next hop node does not match the local node while not registering the received delivery predictability from the adjacent node with the delivery predictability database when the next hop node matches the local node; and a step for referring to the delivery predictability database storing the delivery predictability for the destination node calculated in the local node and the received delivery predictability from the adjacent node, thus setting the path toward the destination node.

A routing program of the present invention is a routing program which controls a computer to perform routing on a network communication system such that a path for transmitting data to a destination node is determined based on delivery predictabilities for the destination node calculated in a local node and an adjacent node, wherein the routing program includes a step for calculating delivery predictability of the local node for the destination node; a step for registering the delivery predictability for the destination node calculated in the local node with a delivery predictability database; a step for transmitting to the adjacent node the delivery predictability for the destination node calculated in the local node together with a next hop node string counted from the adjacent node up to an n-th hop (where n is an integer) in a path toward the destination node; a step for receiving from the adjacent node the delivery predictability for the destination node calculated in the adjacent node together with a next hop node string counted from the adjacent node up to an n-th hop (where n is an integer); a step for making a decision as to whether or not the local node is included in the next hop node string received from the adjacent node; a step for registering the received delivery predictability from the adjacent node with the delivery predictability database when the local node is not included in the next hop node string while not registering the received delivery predictability from the adjacent node when the local node is included in the next hop node string; and a step for referring to the delivery predictability database storing the delivery predictability for the destination node calculated in the local node and the received delivery predictability from the adjacent node, thus setting the path toward the destination node.

Effect of the Invention

According to the present invention, it is possible to prevent the occurrence of a loop when determining a path for transmitting data based on delivery predictabilities for a destination node calculated in a local node and an adjacent node.

BRIEF DESCRIPTION OF THE DRAWINGS

[FIG. 3A] An illustration of a delivery predictability database storing delivery predictability calculated in a local node according to the first embodiment of the present invention.

[FIG. 3B] An illustration of a delivery predictability database storing delivery predictability calculated in another node according to the first embodiment of the present invention.

[FIG. 4] An illustration of a routine table according to the first embodiment of the present invention.

[FIG. 10] An explanatory diagram of a message transmitting/receiving procedure in the network communication system according to the second embodiment of the present invention.

[FIG. 11] An illustration of a routing table according to the second embodiment of the present invention.

MODE FOR CARRYING OUT THE INVENTION

Figure 1:
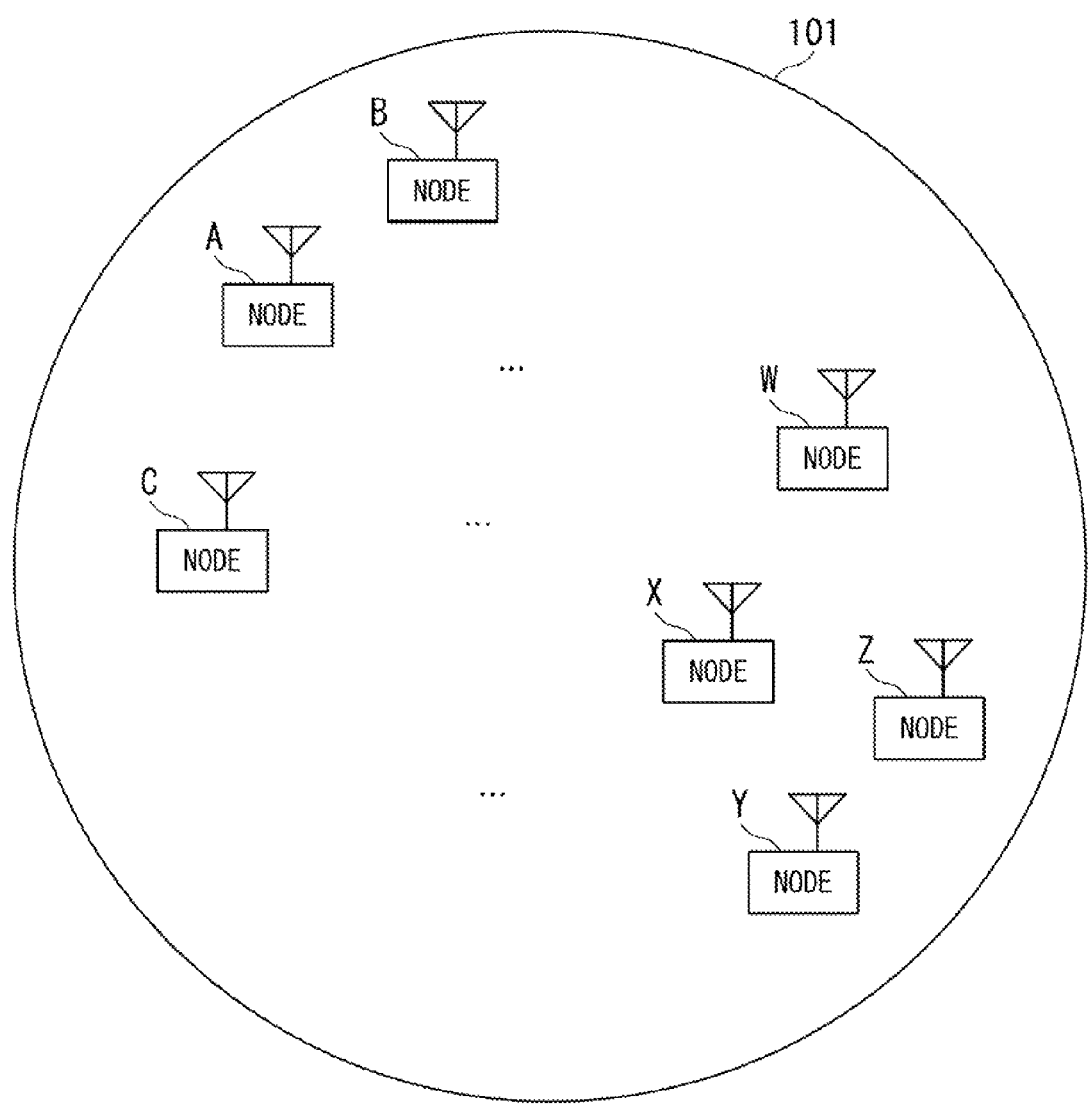
[FIG. 1] An explanatory diagram of the overview of a network communication system according to a first embodiment of the present invention.

Hereinafter, the present invention will be described with reference to specific embodiments. Since skilled person in the art may create a variety of different embodiments based on the description of the present invention, the present invention is not necessarily limited to the illustrative embodiments shown in the drawings.

(First Embodiment)

FIG. 1 shows the overview of a network communication system 101 according to a first embodiment of the present invention. In FIG. 1, the network communication system 101 is configured of a node A, a node B, a node C, . . . , a node W, a node X, a node Y and a node Z. The network communication system 101 is involved in a network environment of a mobile multi-hop network such as a DTN (Delay/Distribution Tolerant Network) and a wireless ad hoc network. The nodes A through Z subdivides transmission data into units of sizes referred to as bundles by use of a wireless communication, for example; hence, procedures of transmitting data toward destination nodes are performed in units of bundles. The number and arrangement of the nodes A through Z can be arbitrarily determined, wherein the nodes A through Z may serve as mobile nodes.

Figure 2:
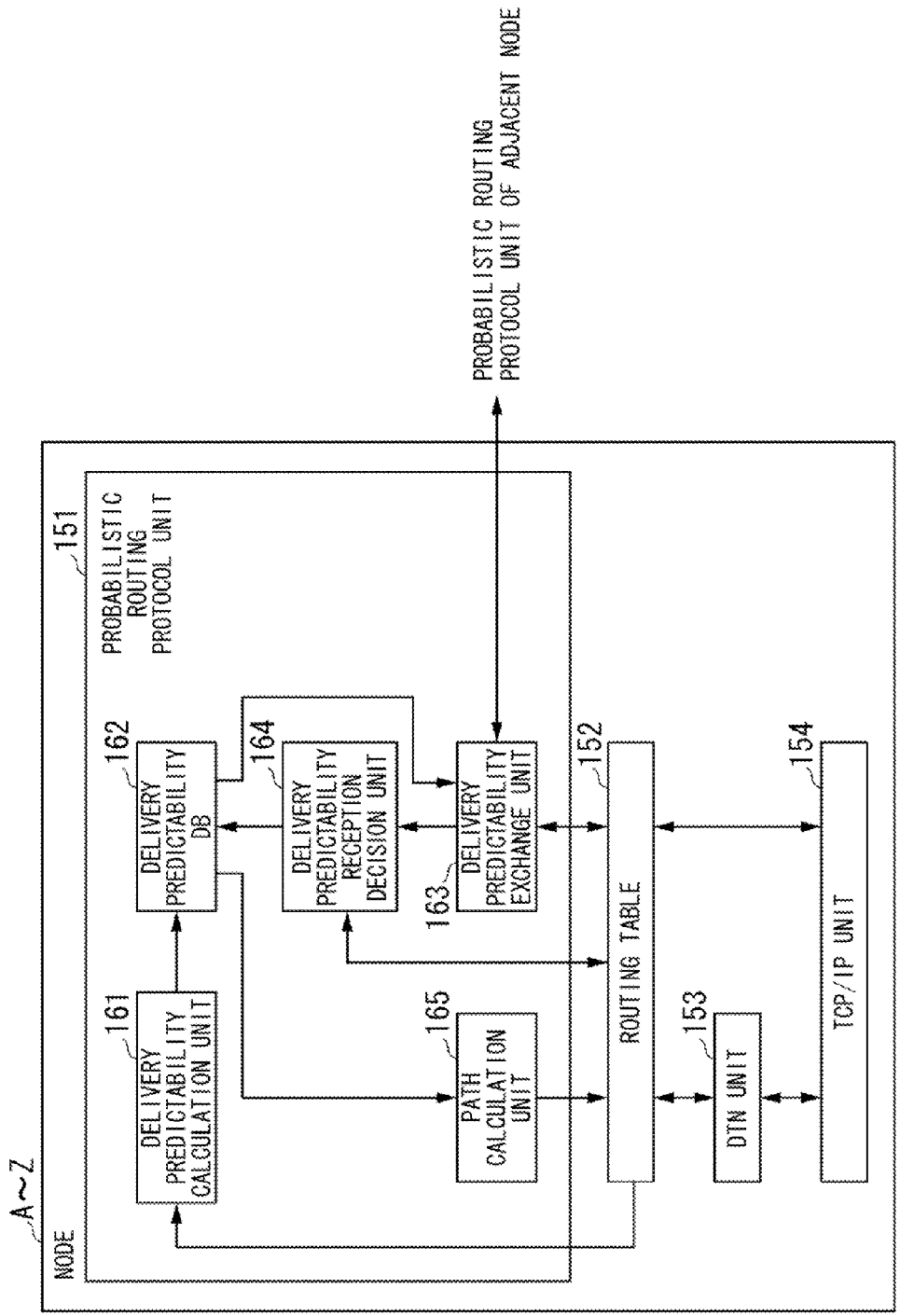
[FIG. 2] A block diagram showing an example of a node in the network communication system according to the first embodiment of the present invention.

FIG. 2 shows the constitution representative of each of the nodes A through Z. As shown in FIG. 2, each of the nodes A through Z is constituted of a probabilistic routing protocol unit 151, a routing table 152, a DTN unit 153 and a TCP/IP unit 154.

The probabilistic routing protocol unit 151 implements a function of exchanging path control information with adjacent nodes and a function of creating paths in order to create entries for the routing table 152.

The probabilistic routing protocol unit 151 is constituted of a delivery predictability calculation unit 161, a delivery predictability database (DB) 162, a delivery predictability exchange unit 163, a delivery predictability reception decision unit 164 and a path calculation unit 165.

The delivery predictability calculation unit 161 implements a function of calculating delivery predictability for a destination node and a function of registering the calculated delivery predictability with the delivery predictability database 162. As an example of algorithm calculating delivery predictability, it is possible to present a calculation method based on an adjacent/nonadjacent status (Non-Patent Document 1) and a calculation method based on path records (Patent Document 1). The calculation method of delivery predictability is not necessarily limited to those methods; hence, it is possible to adopt any type of calculation method.

The delivery predictability database 162 implements a function of accumulating delivery predictability calculated in the delivery predictability calculation unit 161 in a database format. The delivery predictability database 162, the details of which will be described below, is divided into a database of delivery predictability calculated in a local node and a database of delivery predictability received from another node.

The delivery predictability exchange unit 163 implements a function of transmitting delivery predictability, destined to a destination node designated by a local node, to an adjacent node and a function of receiving delivery predictability, destined to a destination node designated by the adjacent node, transmitted from the adjacent node. The delivery predictability information is transmitted/received as an SV message. In the first embodiment of the present invention, this information includes delivery predictability for a destination node and a next hop node for the destination node. When transmitting delivery predictability for a destination node designated by a local node, the local node refers to the delivery predictability database 162 so as to transmit delivery predictability for the destination node calculated in the local node together with a next hop node for the destination node. In addition, the local node receives from adjacent node the delivery predictability for the destination node calculated in the adjacent node together with a next hop node for the destination node.

The delivery predictability reception decision unit 164 implements a function of making a decision as to whether or not delivery predictability received from adjacent node via the delivery predictability exchange unit 163 needs to be registered with the delivery predictability database 162 as the received delivery predictability for the destination node from adjacent node. In the first embodiment of the present invention, the local node receives delivery predictability for the destination node calculated in adjacent node together with the next hop node for the destination node. Herein, the delivery predictability reception decision unit 164 checks whether or not the received next hop node matches the local node, wherein the received delivery predictability is registered with the delivery predictability database 162 when the next hop node does not match the local node, whilst the received delivery predictability is not registered with the delivery predictability database 162 when the next hop node matches the local node.

The path calculation unit 165 refers to the delivery predictability database 162 so as to determine a next hop node for each destination node, thus registering it with the routine table 152 as a routing entry. With respect to each destination node, the next hop node and the next hop ID address, i.e. the IP address corresponding to the next hop node, are registered with the routing table 152.

The DTN unit 153 implements a function for performing a DTN procedure. Specifically, the DTN unit 153 reconfigures received bundles from an adjacent node in a data format, thus temporarily accumulating them in a local node. Upon detecting a next hop of transmission, the data format is subdivided into bundles, which are subsequently transmitted to the next hop. Herein, the next hop of transmission is determined with reference to the routine table 152. In addition, bundles are transmitted/received via the TCP/IP unit 154.

Although the DTN unit 153 is a necessary constituent element for each of the nodes A through Z performing a DTN procedure, it is not a necessary constituent element for another node which does not perform a DTN procedure but perform a normal TCP/IP procedure alone.

The TCP/IP unit 154 implements a function of transmitting/receiving to/from another node the bundles, which are transmitted/received by the DTN unit 153, as IP packets. Each bundle is not directly embedded as a payload of an IP packet, but it is converted into a datagram according to a transport protocol, such as TCP (Transmission Control Protocol) and UDP (User Datagram Protocol), and reformatted into an IP packet, which is subjected to transmission/reception with an adjacent node.

In the aforementioned system of the first embodiment of the present invention, each of the nodes A through Z calculates delivery predictability for a destination node so as to mutually exchange delivery predictability with an adjacent node by way of an SV message. At this time, each of the nodes A through Z calculates and transmits delivery predictability for a destination node together with a next hop node for the destination node. Upon receiving delivery predictability for a destination node together with a next hop node for the destination node, each of the nodes A through Z checks whether or not the next hop node matches the local node itself, wherein delivery predictability accompanied with the next hop node matching the local node is not registered with the delivery predictability database 162.

FIG. 3A and FIG. 3B show examples of entries of delivery predictability registered with the delivery predictability database 162.

Referring to FIG. 3A and FIG. 3B, the delivery predictability database 162 is divided into a delivery predictability database (i.e. delivery predictability calculated by each local node) 162a (FIG. 3A) and a delivery predictability database (i.e. delivery predictability received from another node) 162b (FIG. 3B).

As to the node A, delivery predictability calculated by the delivery predictability calculation unit 161 of the node A is registered with the delivery predictability database 162a. Referring to FIG. 3A, the delivery predictability database 162a registers delivery predictability of "0.6" for the node X and delivery predictability of "0.3" for the node Z.

In addition, delivery predictability which the node A receives from an adjacent node (i.e. nodes B, C, etc.) is registered with the delivery predictability database 162b. Referring to FIG. 3B, the delivery predictability database 162b registers delivery predictability for each destination node together with the name of a node transmitting delivery predictability and a valid time limit of delivery predictability. As to the node X, for example, two delivery predictabilities are received from two nodes, wherein one delivery predictability is set to "0.4" in connection with the node B as a transmitting node and a valid time limit of "2008/8/18 17:10:49.500" whilst the other delivery predictability is set to "0.1" in connection with the node C as a transmitting node and a valid time limit of "2008/8/18 17:11:10.000".

The path calculation unit 165 shown in FIG. 2 refers to the delivery predictability database 162 shown in FIGS. 3A and 3B, thus determining a next hop node for each destination node. Basically, the path calculation unit 165 compares delivery predictabilities for each destination node in the delivery predictability database 162, thus determining the next hop node having the highest delivery predictability.

For instance, one local node produces the delivery predictability database 162a of FIG. 3A while receiving the delivery predictability database 162b of FIG. 3B from another node. In this case, the path calculation unit 165 determines a next hop node for each destination node in accordance with the following procedure, thus registering a routing entry with the routing table 152 shown in FIG. 4.

First, referring to the delivery predictability database 162a of FIG. 3A calculated by the local node and the delivery predictability database 162b of FIG. 3B received from another node with respect to the node X serving as a destination node, the delivery predictability database 162a registers delivery predictability of "0.6" for the node X whilst the delivery predictability database 162b registers two delivery predictabilities of "0.4" and "0.1" for the node X. Therefore, the delivery predictability database 162a registers the highest delivery predictability of "0.6". For this reason, the path calculation unit 152 registers the local node (i.e. the node A) calculating the delivery predictability as the next hop node with the routing table 152 shown in FIG. 4.

As to the node Y serving as a destination node, the delivery predictability database 162a of FIG. 3A registers delivery predictability of "0.2" for the node Y, whilst the delivery predictability database 162b of FIG. 3B registers delivery predictability of "0.5" for the node Y. Therefore, the delivery predictability database 162b registers the highest delivery predictability of "0.5".

For this reason, the path calculation unit 165 registers the node C calculating the delivery predictability as the next hop node with the routing table 152 shown in FIG. 4. Similarly, the path calculation unit 165 registers the nodes A and B as the next hop nodes for the nodes Z and W with the routing table 152 shown in FIG. 4.

FIG. 4 shows examples of entries registered with the routing table 152.

When the routing table 152 shown in FIG. 4 is used as a table for the node A, for example, next hop nodes and next hop IP address, i.e. IP addresses corresponding to next hop nodes, are registered with the routing table 152 with respect to respective destination nodes.

As to the destination node X and the destination node Z, for example, the next hop node is set to the node A currently serving as the local node so that the next hop IP address is set to "10.0.0.1". In addition, the next hop node for the destination node Y is set to the node C so that the next hop IP address is set to "10.0.0.3", whilst the next hop node for the destination node W is set to the node B so that the next hop IP address is set to "10.0.0.2". Bundles for the destination node X or Z are not transmitted to adjacent nodes but accumulated and retained.

Figure 5:
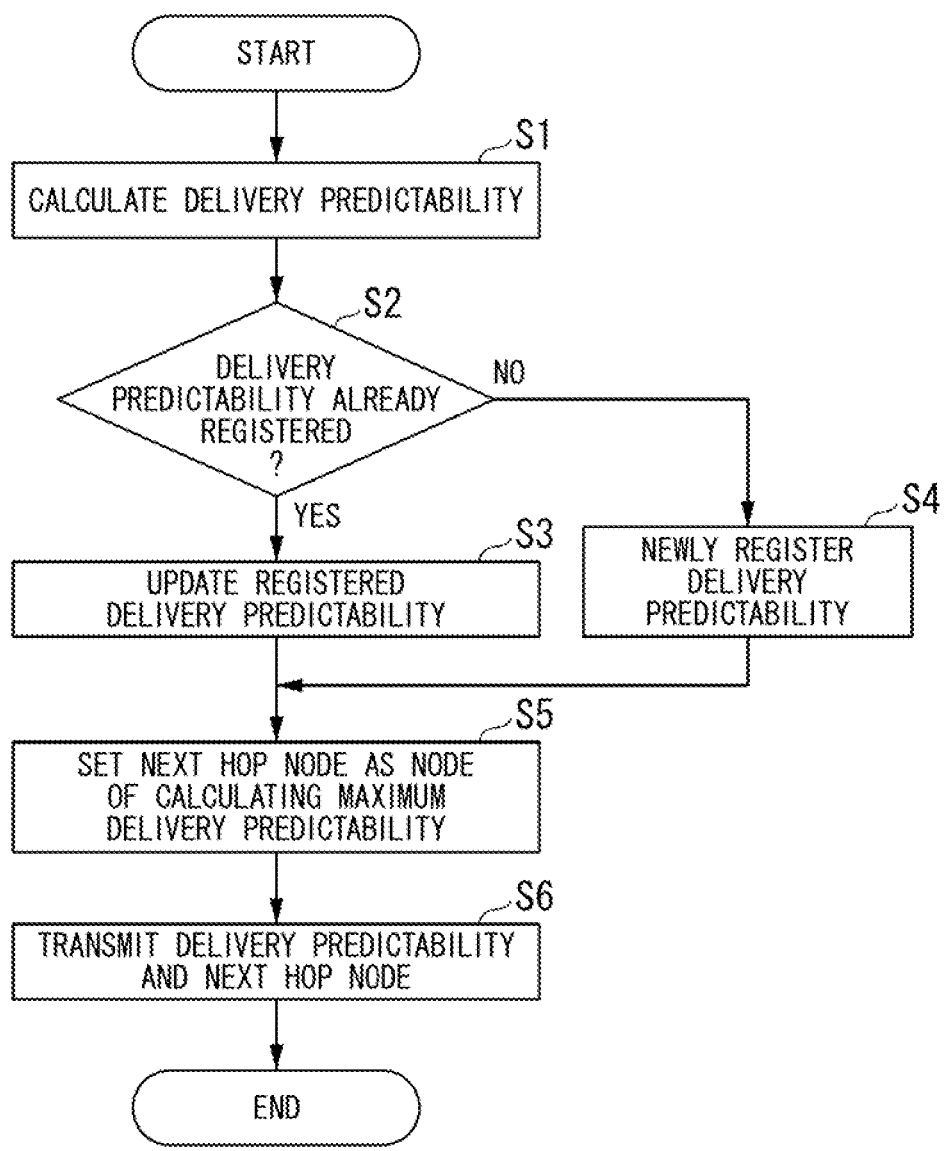
[FIG. 5] A flowchart showing a delivery predictability transmitting procedure in the network communication system according to the first embodiment of the present invention.

FIG. 5 is a flowchart showing a transmitting procedure in which the node A transmits delivery predictability to an adjacent node in the network communication system 101 of the first embodiment of the present invention.

First, in the node A, the delivery predictability calculation unit 161 calculates delivery predictability (step S1). The delivery predictability calculation unit 161 checks whether or not delivery predictability for the same destination node has been already registered with the delivery predictability database 162 (step S2). The delivery predictability calculation unit 162 updates the delivery predictability of the preexisting entry in the delivery predictability database 162 when the delivery predictability for the same destination node has been already registered (step S3), whilst the delivery predictability calculation unit 162 newly registers the delivery predictability for the same destination which has not been already registered (step S4).

The path calculation unit 165 sets the node calculating the highest delivery predictability as a next hop node for a destination node. When the local node matches the node calculating the highest delivery predictability, the path calculation unit 165 sets the local node itself as the next hop node (step S5). The delivery predictability exchange unit 163 broadcasts an SV message, which includes the delivery predictability and the next hop node for the destination node, to an adjacent node (step S6). These steps can be performed by a computer implementing the software.

Figure 6:
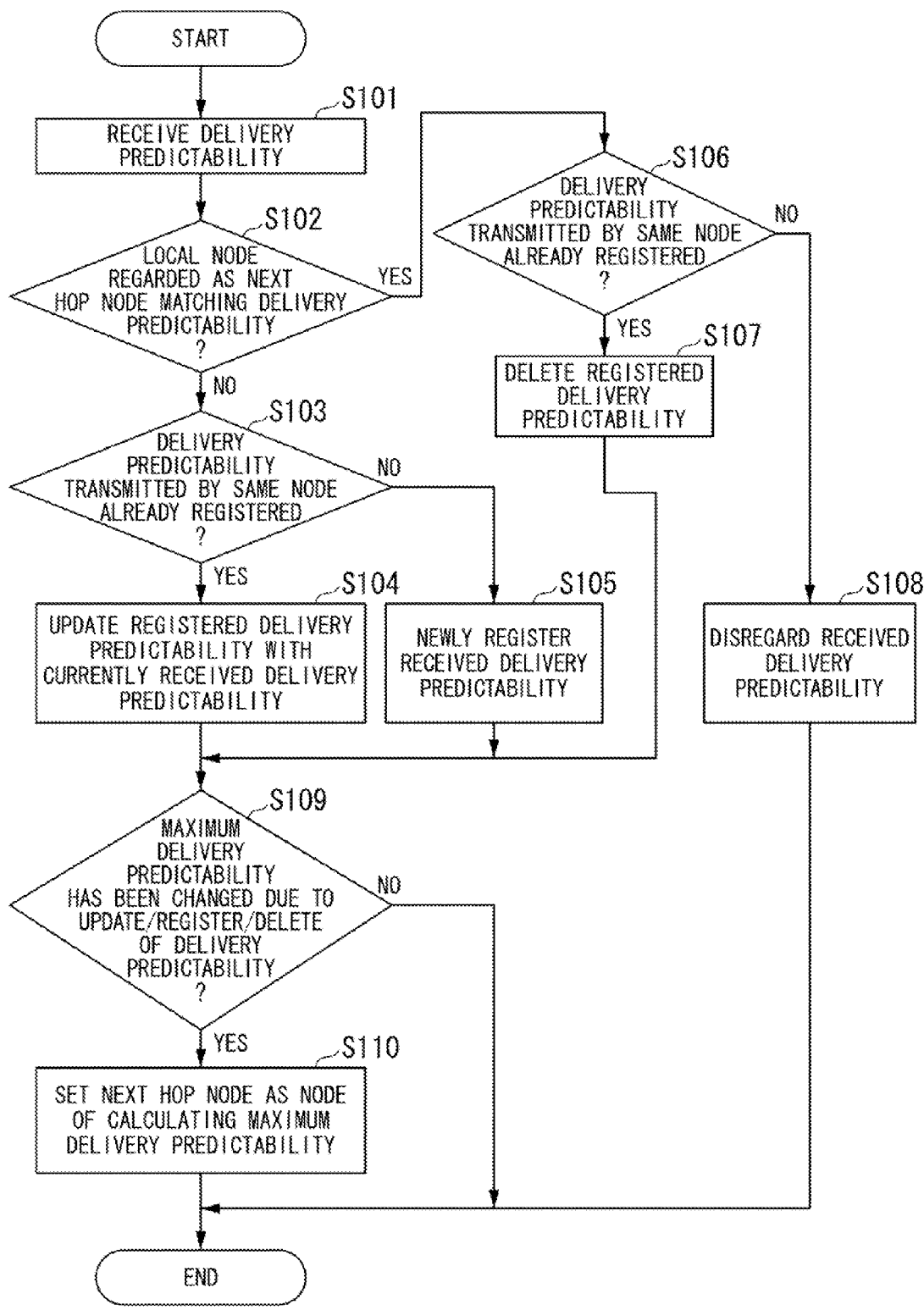
[FIG. 6] A flowchart showing a delivery predictability receiving procedure in the network communication system according to the first embodiment of the present invention.

FIG. 6 is a flowchart showing a receiving procedure in which the node A receives delivery predictability from an adjacent node in accordance with the first embodiment of the present invention.

First, the node A receives an SV message, which includes a list of delivery predictabilities and next hop nodes for a destination node, from an adjacent node (step S101). The delivery predictability exchange unit 263 transfers the received list of delivery predictabilities to the delivery predictability reception decision unit 164.

Next, the delivery predictability reception decision unit 164 makes a decision as to whether not each of the delivery predictabilities received in step S101 needs to be registered with the delivery predictability database 162. The delivery predictability reception decision unit 164 refers to the next hop node paired with the delivery predictability so as to check whether or not the next hop node matches the local node (step S102).

When the decision result of step S102 indicates that the next hop node does not match the local node, the delivery predictability reception decision unit 164 checks whether or not delivery predictability for the same destination node has been registered with the delivery predictability database 162 (step S103).

When the decision result of step S103 indicates that the delivery predictability for the same destination node has been registered, the delivery predictability reception decision unit 164 updates the next hop node and the delivery predictability of the preexisting entry in the delivery predictability database 162 (step S104). When the decision result of step S103 indicates that delivery predictability for the same destination node has not been registered, the delivery predictability reception decision unit 164 newly registers the received delivery predictability and the next hop node with the delivery predictability database 162 (step S105).

When the decision result of step S102 indicates that the next hop node matches the local node, the delivery predictability reception decision unit 164 checks whether or not the delivery predictability for the same destination node has been already registered (step S106).

When the decision result of step S106 indicates that the delivery predictability for the same destination node has been already registered, the delivery predictability reception decision unit 164 deletes the preexisting entry of the delivery predictability database 162 (step S107). When the decision result of step S106 indicates that the delivery predictability for the same destination node has not been registered, the delivery predictability reception decision unit 164 neglects the delivery predictability received in step S101 (step S108), thus exiting the procedure.

After completion of steps S104, S105 and S107, a decision is made as to whether or not the highest delivery predictability for the destination node has been changed due to updating/registration/deletion of delivery predictability in these steps (step S109).

When a change is detected in step S109, the path calculation unit 165 sets the node calculating the highest delivery predictability as the next hop node for the destination node. When the local node matches the node calculating the highest delivery predictability, the path calculation unit 165 sets the local node itself as the next hop node (step 110). These steps are performed by a computer implementing the software.

Figure 7:
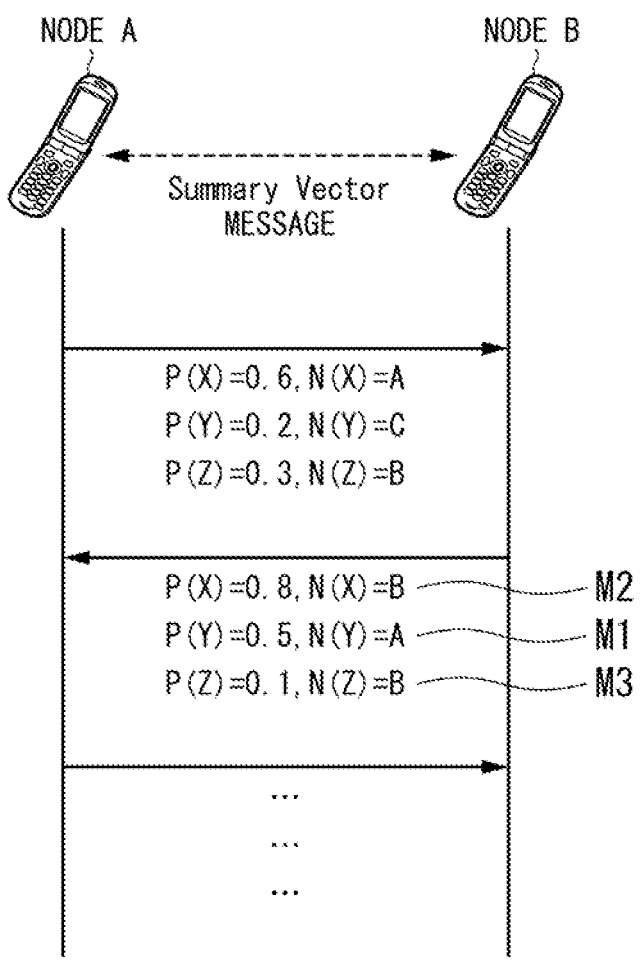
[FIG. 7] An explanatory diagram of a message transmitting/receiving procedure in the network communication system according to the first embodiment of the present invention.

For instance, messages are transmitted/received between the nodes A and B as shown in FIG. 7. Herein, both the nodes A and B transmit delivery predictability calculated in each local node together with the next hop node for each destination node.

In FIG. 7, the node B transmits an SV message of "P(Y)=0.5, N(Y)=A" (i.e. a message M1). In this SV message M1, "P(Y)=0.5" indicates that delivery predictability for the node Y is "0.5". In addition, "N(Y)=A" indicates that the next hop node for that node (the node Y) is the node A. The node A receiving this message determines that the local node itself is equivalent to the next hop node, i.e. N(Y) paired with the delivery predictability. Therefore, this delivery predictability is not registered with the delivery predictability database 162 of the node A.

In contrast, the node B receives other SV messages, i.e. "P(X)=0.8, N(X)=B" (i.e. a message M2) and "P(Z)=0.1, N(Z)=B" (i.e. a message M3), indicating that both the next hop nodes N(X), N(Z) are not equivalent to the node A, the delivery predictabilities paired with those next hop nodes are registered with the delivery predictability database 162 of the node A.

According to the first embodiment of the present invention, each of the nodes A through Z calculates delivery predictability for each destination node, wherein when exchanging delivery predictability with adjacent nodes, each of the nodes A through Z transmits the calculated delivery predictability together with the next hop node for each destination node. Upon receiving the next hop node and the delivery predictability for each destination node, each of the nodes A through Z checks whether or not the next hop node matches the local node itself, thus preventing the delivery predictability whose next hop node matches the local node from being registered with the delivery predictability database 162. Thus, even when a message conveying delivery predictability toward an adjacent node is lost, it is possible to prevent the occurrence of a routing loop. This procedure will be described with reference to FIG. 8.

Figure 8:
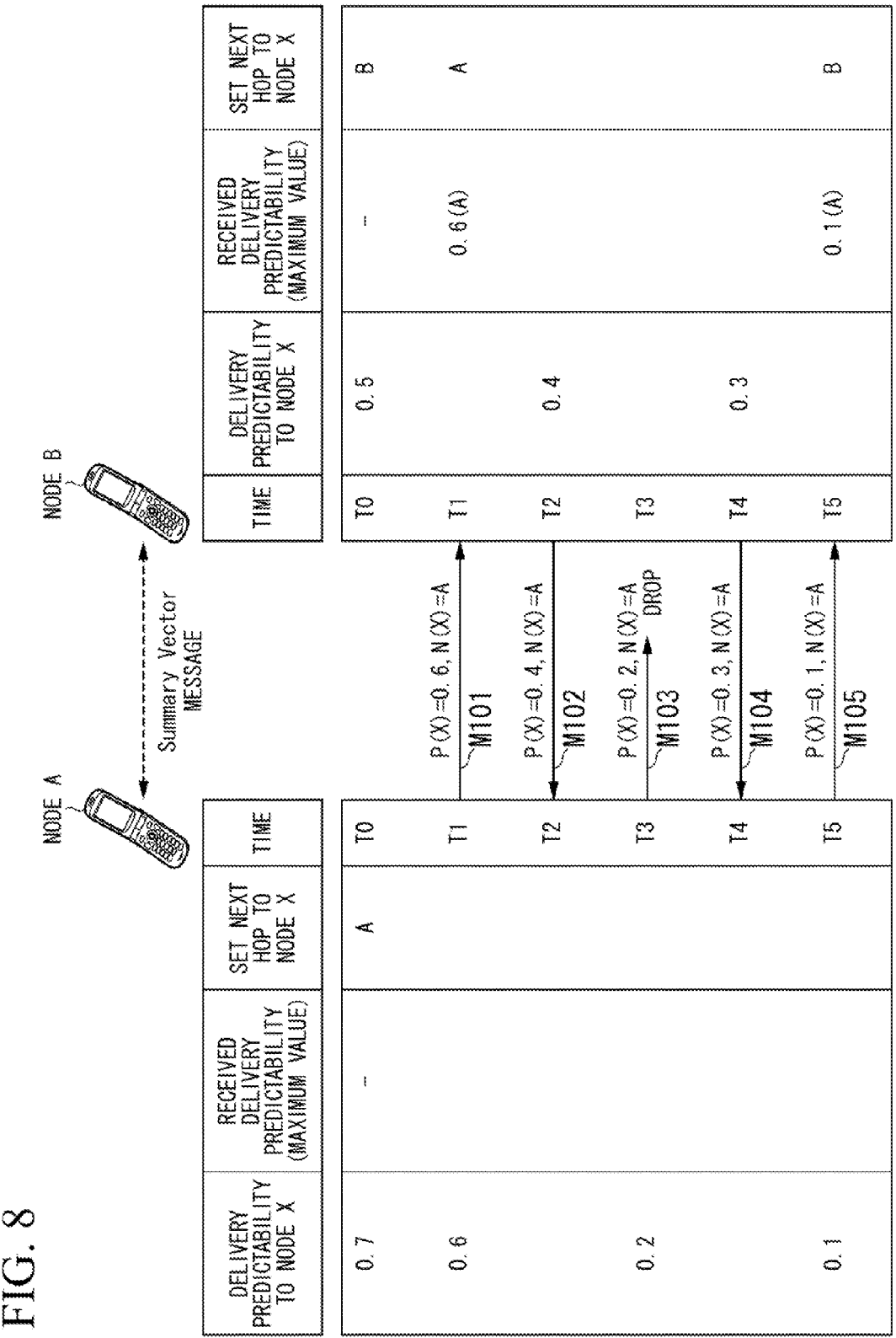
[FIG. 8] An explanatory diagram of routing in the network communication system according to the first embodiment of the present invention.

FIG. 8 shows that the nodes A and B adjoin with each other. Each of the nodes A and B periodically transmits an SV message including a next hop node and delivery predictability. The following description refers to the procedure of transmitting bundles to the destination node X.

In an initial state, at time T0, the node calculates delivery predictability of "0.7" for the node X but does not receive delivery predictability from other nodes. Therefore, at time T0, the next hop node which the node A needs to transfer bundles addressing the node X is set to the local node, i.e. the node A.

At the same time T0, the node B calculates delivery predictability of "0.5" for the node X but does not receive delivery predictability from other nodes. Therefore, at time T0, the next hop node which the node B needs to transfer bundles addressing the node X is regarded as the local node, i.e. the node B.

Next, at time T1, the node A recalculates delivery predictability for the node X so as to update it from "0.7" to "0.6". The updated delivery predictability is immediately broadcast to adjacent nodes including the node B by way of an SV message. The node A transmits the next hop node N(X) destined to the node X along with delivery predictability P(X). That is, the node A transmits "P(X)=0.6, N(X)=A" (i.e. a message M101).

At time T1 when the node B receives the message M101, including the updated delivery predictability for the node X, from the node A, the node B checks whether or not the delivery predictability needs to be registered with the delivery predictability database 162 by way of a decision as to whether or not the next hop node for the node X, paired with the delivery predictability, matches the local node itself. Since the checking result indicates N(X)=A which does not match the local node (i.e. the node B), the node B registers with the delivery predictability database 162 the received delivery predictability of "0.6" and the node A transmitting the delivery predictability. As a result, FIG. 8 shows the registration of "0.6(A)". At the same time, the node B compares the delivery predictability of "0.5" calculated therein with the received delivery predictability of "0.6" from the node A, wherein "0.6" is higher so that the node A transmitting this delivery predictability is set as the next hop node for the node X. In actuality, other delivery predictabilities received from adjacent nodes precluding the node A are subjected to comparison, whereas for the sake of simplicity of illustration, the following description refers to the situation in which the node B receives delivery predictability from the node A alone.

Next, at time T2, the node B recalculates delivery predictability for the node X so as to update it from "0.5" to "0.4". After updating, the node B compares the calculated delivery predictability of "0.4" with the received delivery predictability of "0.6", wherein "0.6" is higher so that the node A still remains as the next hop node for the node X. The node B immediately broadcasts the updated delivery predictability to adjacent nodes including the node A by way of an SV message. Herein, the node B transmits the next hop node N(X) for the node X along with delivery predictability P(X). That is, the node B transmits "P(X)=0.4, N(X)=A" (i.e. a message M102).

At time T2 when the node A receives the message M102, including the updated delivery predictability for the node X, from the node B, the node A checks whether or not the delivery predictability needs to be registered with the delivery predictability database 162 by way of a decision as to whether or not the next hop node for the node X, paired with the delivery predictability, matches the local node itself. Since the checking result indicates "N(X)=A" matching the local node (i.e. the node A), the node A determines not to register the received delivery predictability with the delivery predictability database 162.

Next, at time T3, the node A recalculates delivery predictability so as to update it from "0.6" to "0.2". Similar to the foregoing procedure at time T1, the node A broadcasts the updated delivery predictability by way of an SV message. That is, the node A transmits "P(X)=0.2, N(X)=A" (i.e. a message M103). Due to some cause, however, the node B fails to receive the message M103.

At time T3 when the node B fails to receive the SV message (i.e. the message M103) from the node A, no change occurs in the status of the node B so that the node A still remains as the next hop node for the node X.

Next, at time T4, the node B recalculates delivery predictability for the node X so as to update it from "0.4" to "0.3". The node B immediately broadcasts the updated delivery predictability to adjacent nodes including the node A by way of an SV message. Herein, the node B transmits the next hop node N(X) for the node X along with the delivery predictability P(X). That is, the node B transmits "P(X)=0.3, N(X)=A" (i.e. a message M104).

At time T4 when the node A receives the message M104, including the updated delivery predictability for the node X, from the node B, the node B checks whether or not the delivery predictability needs to be registered with the delivery predictability database 162 by way of a decision as to whether or not the next hop node for the node X, paired with the delivery predictability, matches the local node itself. Since the checking result indicates "N(X)=A" matching the local node (i.e. the node A), the node A determines to not register the received delivery predictability with the delivery predictability database 162.

Next, at time T5, the node A recalculates delivery predictability for the node X so as to update it from "0.2" to "0.1". Subsequently, the node A broadcasts the updated delivery predictability by way of an SV message. Herein, the node A transmits the next hop node N(X) for the node X along with the delivery predictability P(X). That is, the node A transmits "P(X)=0.1, N(X)=A" (i.e. a message M105). The node B succeeds to receive the message M105 transmitted at time T5.

At time when the node B receives the SV message (i.e. the message M105), including the updated delivery predictability for the node X, from the node A, the node B cheeks whether or not the delivery predictability needs to be registered with the delivery predictability database 162 by way of a decision as to whether or not the next hop node for the node X, paired with the delivery predictability, matches the local node itself. Since the checking result indicates "N(X)=A" which does not match the local node (B), the node B registers with the delivery predictability database 162 the received delivery predictability of "0.1" and the node A transmitting the delivery predictability. As a result, FIG. 8 shows the registration of "0.1(A)". At the same time, the node B compares the calculated delivery predictability of "0.3" with the received delivery predictability of "0.1", wherein "0.3" is higher so that the node B serving as the local node is set as the next hop node for the node X.

In the above example, a routing loop state does not occur between the nodes A and B at time T0 and onwards. This is because a decision whether to register the received delivery predictability is made based on the next hop node paired with the received delivery predictability, thus eliminating a possibility that a certain node causing a loop between two nodes is selected as the next hop node.

According to the first embodiment of the present invention described above, each node transmits delivery predictability to an adjacent node together with the next hop node for each destination node; each node receiving delivery predictability checks whether or not the received next hop node matches the local node itself; when they match each other, each node prevents registration of the received delivery predictability, thus preventing a certain node transmitting the delivery predictability from being selected as the next hop node for each destination node. For this reason, the routing method based on delivery predictability is able to prevent the occurrence of a routing loop between two nodes.

(Second Embodiment)

Next, a second embodiment of the present invention will be described in detail with reference to the drawings. The first embodiment is effective in preventing the occurrence of a routing loop between two nodes, but it is impossible to prevent the occurrence of a routine loop between three or more nodes. In contrast, the present embodiment is designed to prevent the occurrence of a routing loop between three or more nodes.

Similar to the network communication system 101 of the first embodiment shown in FIG. 1, the system of the second embodiment of the present invention is configured of the node A, the node B, the node C, . . . , the node W, the node X, the node Y and the node Z.

Figure 9:
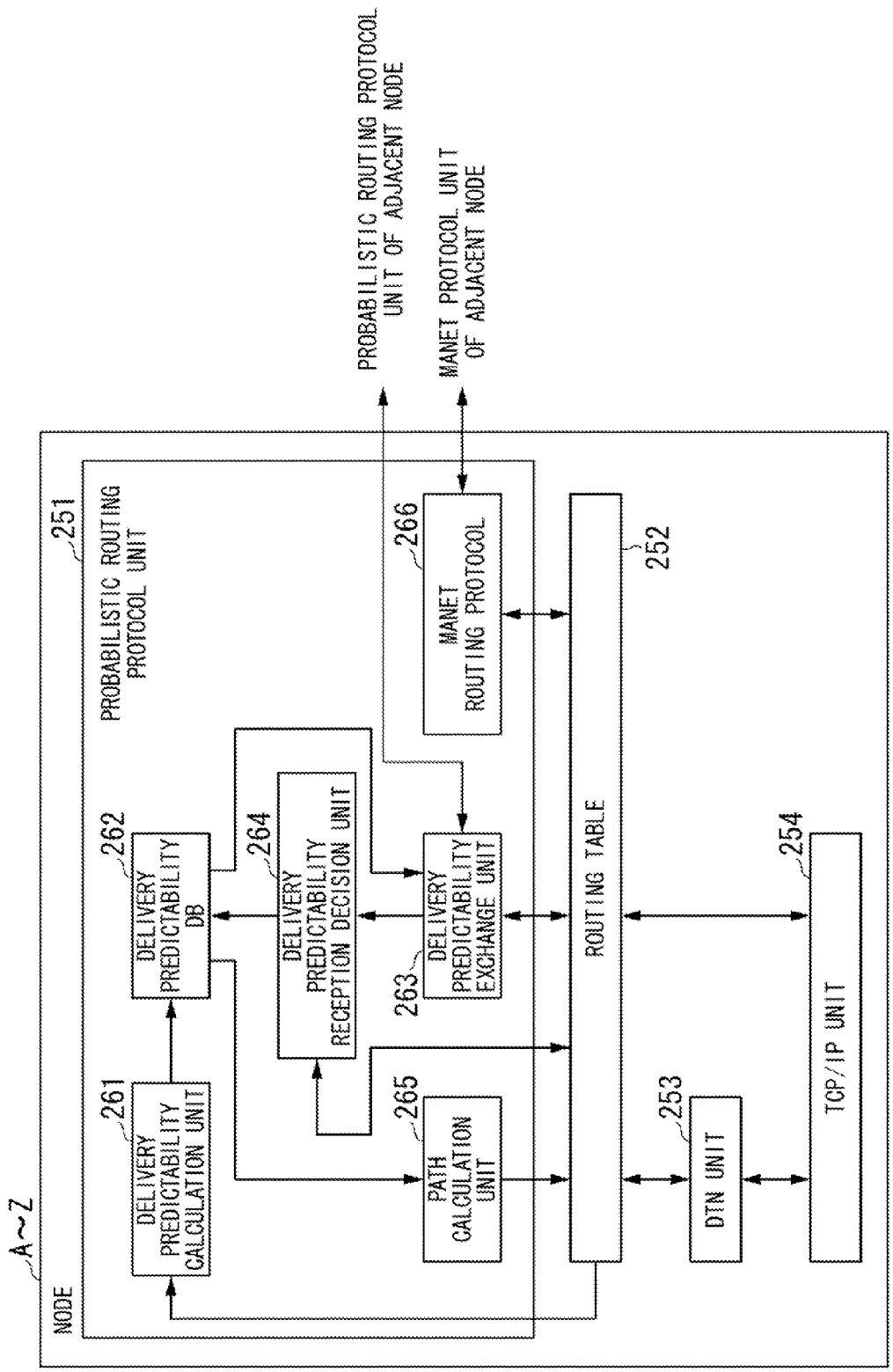
[FIG. 9] A block diagram showing an example of a node in a network communication system according to a second embodiment of the present invention.

FIG. 9 shows the constitution of each of the nodes A through Z according to the second embodiment of the present invention. In the second embodiment of the present invention, each of the nodes A through Z is constituted of a probabilistic routing protocol unit 251, a routing table 252, a DTN unit 253 and a TCP/IP unit 254.

The probabilistic routing protocol unit 251 is constituted of a delivery predictability calculation unit 261, a delivery predictability database (DB) 262, a delivery predictability exchange unit 263, a delivery predictability reception decision unit 264, a path calculation unit 265 and a MANET routing protocol 266.

The functions of the DTN unit 253 and the TCP/IP unit 254 are equivalent to the functions of the DTN 153 and the TCP/IP unit 154 in the first embodiment; hence, their explanations will be omitted. In addition, the functions of the delivery predictability calculation unit 261 and the delivery predictability database (DB) in the probabilistic routing protocol unit 251 are equivalent to the functions of the delivery predictability calculation unit 161 and the delivery predictability database (DB) in the probabilistic routing protocol unit 151 of the first embodiment; hence, explanations thereof will be omitted.

Similar to the function of the delivery predictability exchange unit 163 of the first embodiment transmitting/receiving delivery predictability, the delivery predictability exchange unit 263 transmits delivery predictability together with a next hop node string in the routing table 252. The next hop node string is a list describing a plurality of nodes counted up to an n-th hop (where n=integer) from the local node in a transmission path from the local node to the destination node. When the transmission path from the node A to the node X is configured of the node A, the node B, the node D, the node E and the node X in order with the number n of hops (where n=2), for example, the corresponding next hop node string includes a plurality of nodes counted up to the second hop node from the node A, i.e. the node B and the node D.

FIG. 10 shows delivery predictabilities transmitted by the delivery predictability exchange unit 263 and next hop node strings.

FIG. 10 shows that the node A, the node B and the node C adjoin together, wherein delivery predictabilities and next hop node strings are broadcast from the node A, the node B and the node C. In this example, delivery predictabilities P(X), P(Y) and P(Z) paired with next hop node strings N(X), N(Y) and N(Z) are collectively subjected to transmission. When the next hop node matches the local node, which is not a second hop node, only the node A serving as the local node is listed in a next hop node string.

Similar to the function of the delivery predictability reception decision unit 164 of the first embodiment, the delivery predictability reception decision unit 264 implements a function of making a decision as to whether or not delivery predictability received from an adjacent node needs to be registered as delivery predictability received from another node with the delivery predictability database 262. The delivery predictability reception decision unit 264 adopts a decision criterion in which delivery predictability does not need to be registered when the local node is included in a next hop node string, which is paired with delivery predictability and received by the delivery predictability exchange unit 263.

According to the foregoing function of transmitting/receiving delivery predictability shown in FIG. 10, for example, the node B transmits delivery predictability of "P(Y)=0.5" (i.e. the message M201) but the node A receiving this message designates a next hop node string of "N(Y)=A–F" paired with the transmitted delivery predictability, which includes the local node; hence, the node A does not register the delivery predictability with the delivery predictability database 262. In addition, the node B transmits delivery predictability of "P(Z)=0.1" (i.e. the message M202), but the node C receiving this message designates a next hop node string of "N(C)=E–C" paired with the transmitted delivery predictability, which includes the local node (i.e. the node C); hence, the node C does not register the delivery predictability with the delivery predictability database 262.

Similarly, delivery predictability of "P(Y)=0.2" (i.e. the message M203) and delivery predictability of "P(Z)=0.3" (i.e. the message M204) transmitted by the node A are not registered with the delivery predictability database 262 in each of the nodes B and C. In addition, delivery predictability of "P(X)=0.3" (i.e. the message M205) transmitted by the node C is not registered with the delivery predictability database 262 in each of the nodes A and B.

The MANET routing protocol 266 calculates a next hop node string for each destination node so as to register it with the routing table 252. Herein, OLSR can be named as an example of the routing protocol operable in the NAMET routing protocol 266. The OLSR is a link-state routing protocol and is able to calculate a next hop node string.

When an entry registered with the routing table 252 concurrently matches with an entry registered by the path calculation unit 265 in accordance with the MANET routing protocol 266, the entry which needs to be registered by way of the MANET routing protocol 266 establishing an end-to-end path is generally prioritized.

The routing table 252 differs from the routing table 152 shown in FIG. 4 in that instead of a next hop node for each destination node, a next hop node string is registered; hence, instead of a next hop IP address for each destination node, a next hop IP address string is registered. FIG. 11 shows entries registered with the routing table 252.

Referring to the routing table 252 shown in FIG. 11, a next hop node string for the destination node Y refers to a sequential order of the nodes C and D, indicating a sequential order of "10.0.0.3" and "10.0.0.4" as a next hop IP address. Similarly, a next hop node string for the destination node Z refers to a sequential order of the nodes B and E, indicating a sequential order of "10.0.0.2" and "10.0.0.5" as a next hop IP address.

Figure 12:
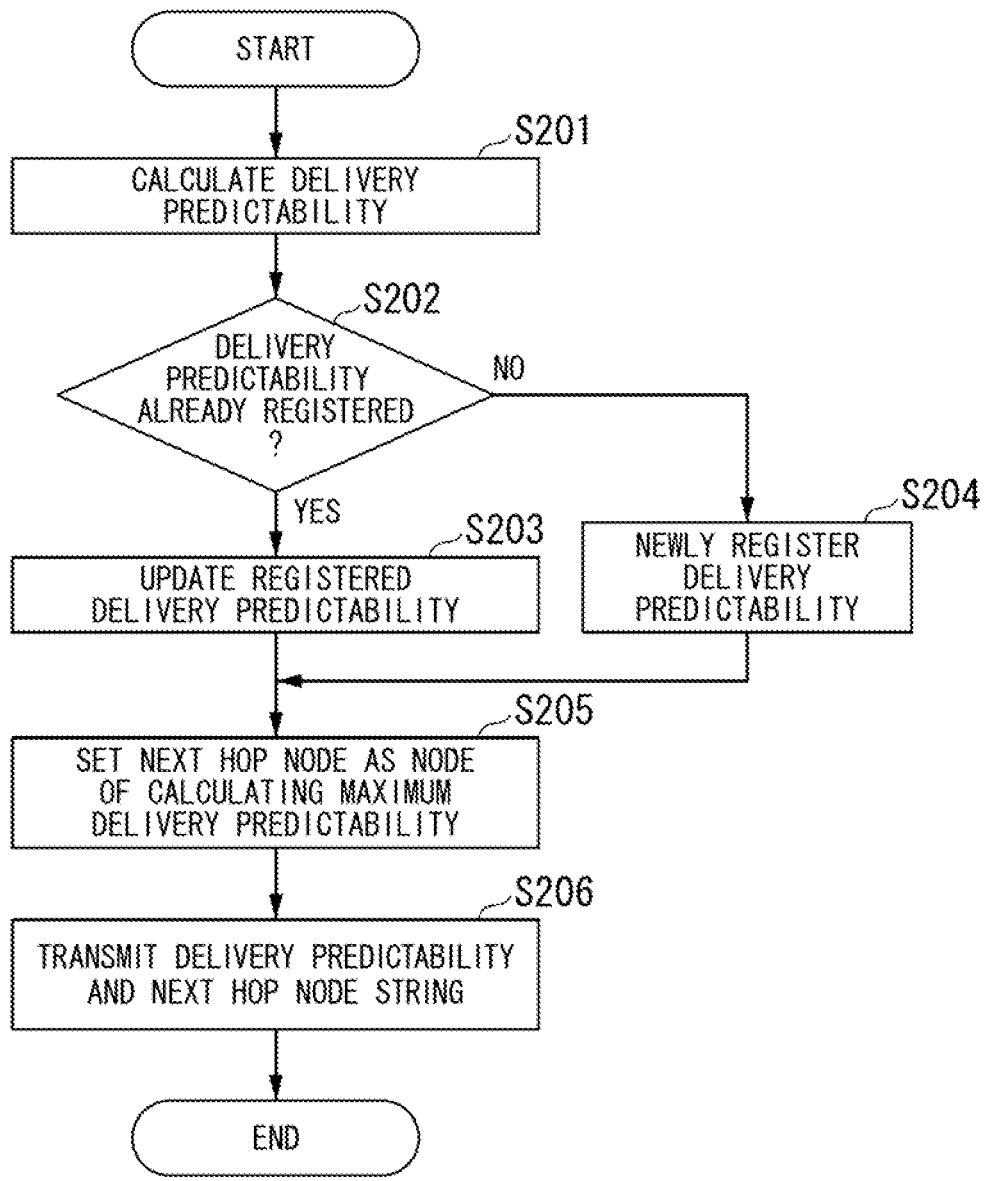
[FIG. 12] A flowchart showing a delivery predictability transmitting procedure in the network communication system according to the second embodiment of the present invention.

FIG. 12 is a flowchart showing a transmitting procedure in which the node A transmits delivery predictability to an adjacent node in the second embodiment of the present invention.

First, the delivery predictability calculation unit 261 calculates delivery predictability (step S201). The delivery predictability calculation unit 261 checks whether or not delivery predictability for the same destination node has been already registered with the delivery predictability database 262 (step S202), wherein the delivery predictability calculation unit 261 updates the preexisting entry of delivery predictability in the delivery predictability database 262 when the delivery predictability for the same destination node has been already registered (step S203), whilst the delivery predictability calculation unit 261 newly registers the delivery predictability for the same destination node, which is not registered (step S204).

The path calculation unit 265 sets the node calculating the highest delivery predictability as the next hop node for each destination node. When the local nodes calculates the highest delivery predictability, the path calculation unit 265 sets the local node itself as the next hop node (step S205). The delivery predictability exchange unit 263 broadcasts an SV message including delivery predictability and a next hop node string for each destination node to an adjacent node (step S206). These steps can be performed by a computer implementing the software.

Figure 13:
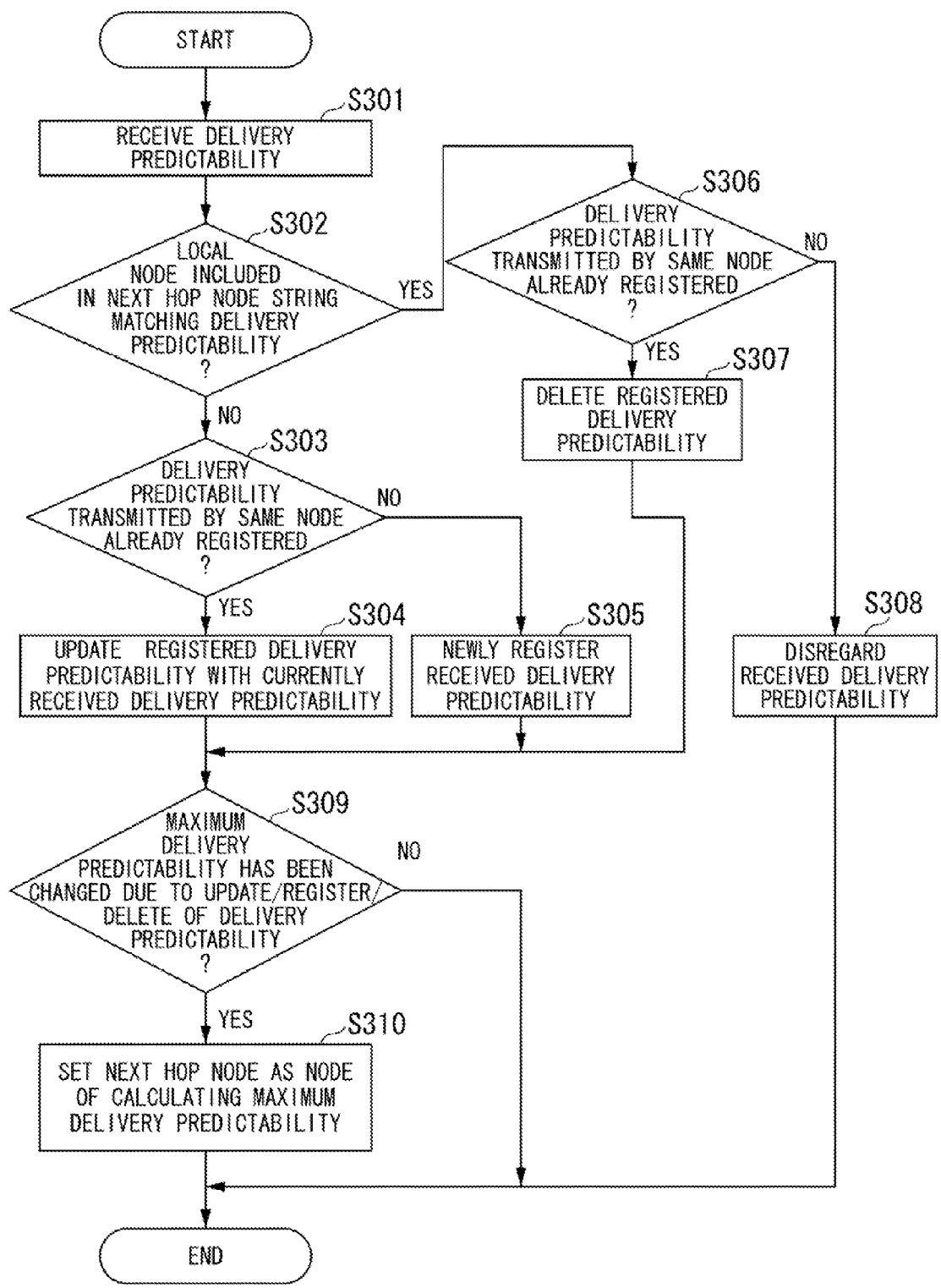
[FIG. 13] A flowchart showing a delivery predictability receiving procedure in the network communication system according to the second embodiment of the present invention.
Figure 14:
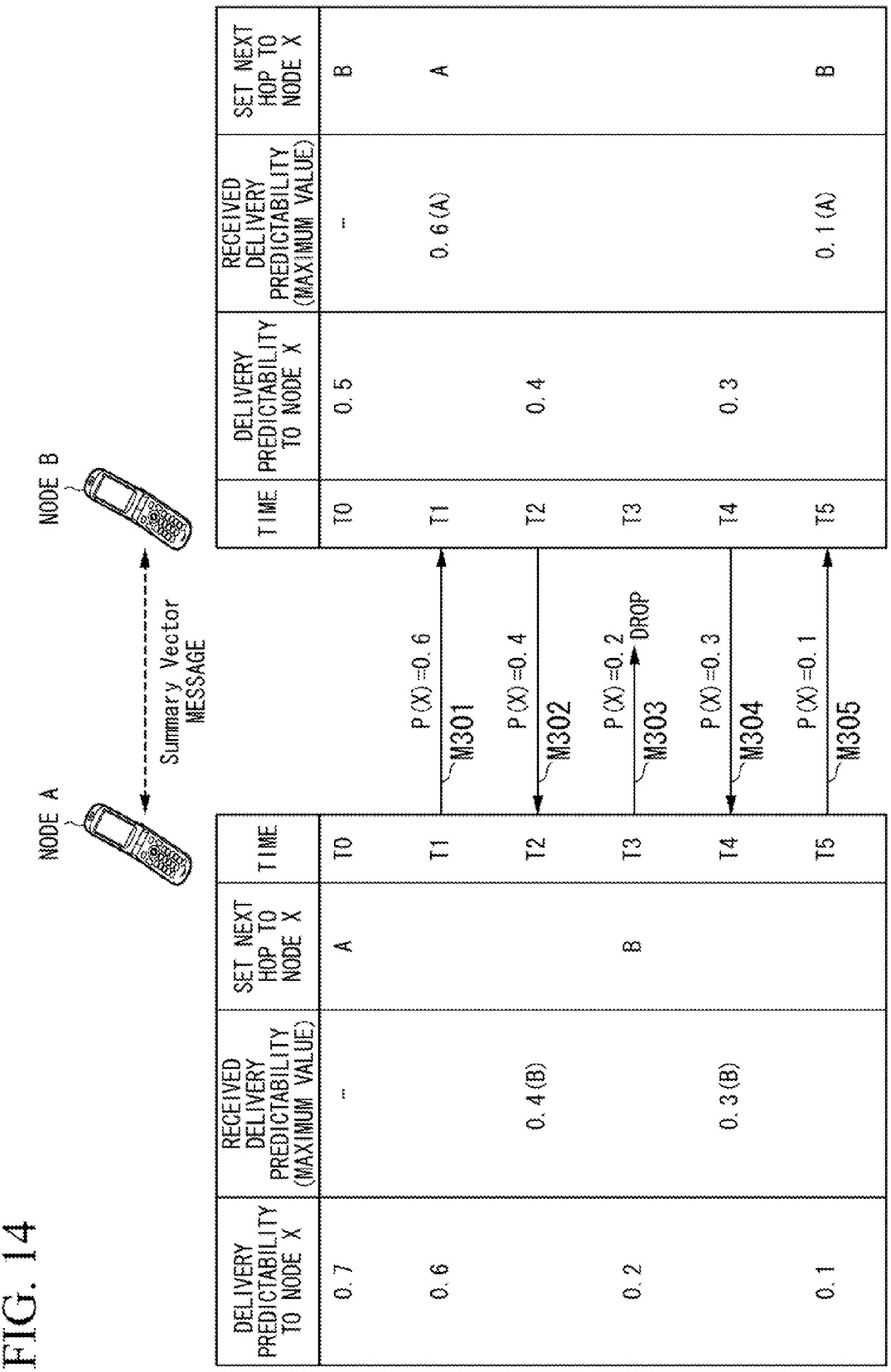
[FIG. 14] An explanatory diagram of routing in the conventional network communication system.

FIG. 13 is a flowchart showing a receiving procedure in which each node receives delivery predictability from an adjacent node in the second embodiment of the present invention.

First, the delivery predictability exchange unit 263 of each node receives an SV message including a delivery predictability list and a next hop node string for each destination node (step S301). The delivery predictability exchange unit 263 transfers the received delivery predictability list to the delivery predictability reception decision unit 264.

Next, the delivery predictability reception decision unit 264 makes a decision as to whether or not each delivery predictability received in step S301 needs to be registered with the delivery predictability database 262. Herein, the delivery predictability reception decision unit 264 refers to the next hop node string paired with the transmitted delivery predictability so as to check whether or not the local node is included in the next hop node string (step S302).

When the decision result of step S302 indicates that the local node is not included in the next hop node string, the delivery predictability reception decision unit 264 checks whether or not the delivery predictability for the same destination node has been already registered with the delivery predictability database 262 (step S303).

When the decision result of step S303 indicates that the delivery predictability for the same destination node has been already registered with the delivery predictability database 262, the delivery predictability reception decision unit 264 updates the preexisting entry of delivery predictability and the next hop node string in the delivery predictability database 262 (step S304). When the decision result of step S303 indicates that the delivery predictability for the same destination node has not been registered with the delivery predictability database 262, the delivery predictability reception decision unit 264 newly registers the received delivery predictability and the next hop node string with the delivery predictability database 262 (step S305).

When the decision result of step S302 indicates that the local node is not included in the next hop node string, the delivery predictability reception decision unit 264 checks whether or not delivery predictability for the same destination node has been already registered (step S306).

When the decision result of step S306 indicates that the delivery predictability for the same destination node has been already registered, the delivery predictability reception decision unit 264 deletes the preexisting entry of delivery predictability in the delivery predictability database 262 (step S307). When the decision result of step S306 indicates that the delivery predictability for the same destination node has not been registered, the delivery predictability reception decision unit 264 disregards the delivery predictability received in step S301 (step S308), thus exiting this procedure.

After completion of steps S304, S305 and S307, the delivery predictability reception decision unit 264 checks whether or not the highest delivery predictability for each destination node have been changed due to update/register/delete of delivery predictability due to these steps (step S309).

When the step S309 detects a change, the path calculation unit 265 sets the node calculating the highest delivery predictability as the next hop node for each destination node. When the local node calculates the highest delivery predictability, the path calculation unit 265 sets the local node as the next hop node (step S310). These steps can be performed by a computer implementing the software.

In the present embodiment, the delivery predictability exchange unit 263 transmits delivery predictability together with a next hop node string for each destination node. In the node receiving delivery predictability, the delivery predictability reception decision unit 264 checks whether or not the local node is included in the next hop node string paired with the received delivery predictability. When the local node is included in the next hop node string, the delivery predictability reception decision unit 264 does not register the received delivery predictability with the delivery predictability database 262, thus preventing the path calculation unit 265 from selecting the node transmitting the delivery predictability as the next hop node for each destination node.

Owing to the above procedures, it is possible to prevent nodes, which likely cause loops, as next hop nodes.

The first embodiment is effective in preventing the occurrence of a routing loop between two nodes but is unable to prevent the occurrence of a routing loop between three or more nodes. In contrast, the present embodiment is able to prevent the occurrence of a routing loop between three or more nodes.

Specifically, when the delivery predictability exchange unit 263 transmits a next hop node string counted up to an n-th hop, it is possible to prevent the occurrence of a loop between (n+1) nodes, wherein it is possible to prevent the occurrence of a loop between plural nodes by changing the number n. When the delivery predictability exchange unit 263 transmits a next hop node string counted up to a second hop with n=2, for example, it is possible to prevent the occurrence of a loop between three nodes.

According to the second embodiment of the present invention, each node transmits delivery predictability paired with a next hop node string for each destination node to an adjacent node, whilst each node receiving delivery predictability checks whether or not the local node is included in the received next hop node string. When the local node is included in the next hop node string, the received delivery predictability is not registered, thus preventing the node receiving the delivery predictability from being selected as a next hop node for each destination node; hence, it is possible to prevent the occurrence of a routing loop between plural nodes in the routing method based on delivery predictability. By changing the number of next hop nodes included in the transmitted next hop node string, it is possible to adjust the number of nodes which are subjected to the procedure of preventing the occurrence of a routing loop.

The present invention is not necessarily limited to the foregoing embodiments; hence, it is possible to implement adequate change and modification without departing from the scope of the present invention.

Industrial Applicability

The present invention is applicable to a network communication system or the like which determines a path for transmitting data based on delivery predictability for each destination node calculated in each local node and adjacent node.

Description of the Reference Numerals

101 Network communication system
151 Probabilistic routing protocol unit
152 Routing table
153 DTN unit
154 TCP/IP unit
161 Delivery predictability calculation unit
162 Delivery predictability database
163 Delivery predictability exchange unit
164 Delivery predictability reception decision unit
165 Path calculation unit
251 Probabilistic routing protocol unit
252 Routing table
253 DTN unit
254 TCP/IP unit
261 Delivery predictability calculation unit
262 Delivery predictability database
263 Delivery predictability exchange unit
264 Delivery predictability reception decision unit
265 Path calculation unit
266 NANET routing protocol

The invention claimed is:

1. A network communication system which determines a path for transmitting data to a destination node based on delivery predictabilities for the destination node calculated in a local node and an adjacent node, each node constituting said network communication system comprising:
   a delivery predictability database configured to store a delivery predictability for the destination node calculated in the local node and a delivery predictability received from the adjacent node therein;
   a delivery predictability calculation unit configured to calculates the delivery predictabilities for the destination node and which registers the delivery predictability for the destination node calculated in the local node with the delivery predictability database;
   a delivery predictability exchange unit configured to transmits to the adjacent node the delivery predictability for the destination node calculated in the local node together with a next hop node in a path toward the destination node and which receives from the adjacent node the delivery predictability for the destination node calculated in the adjacent node together with a next hop node in the path toward the destination node;
   a delivery predictability reception decision unit configured to make a decision as to whether or not the next hop node received from the adjacent node matches the local node, wherein the received delivery predictability from the adjacent node is registered with the delivery predictability database when the next hop node received from the adjacent node does not match the local node, while the received delivery predictability from the adjacent node is not registered with the delivery predictability database when the next hop node received from the adjacent node matches the local node; and
   a path calculation unit configured to calculate the path toward the destination node with reference to the delivery predictability database storing the delivery predictability for the destination node calculated in the local node and the delivery predictability received from the adjacent node,
   wherein the delivery predictability reception decision unit is configured to delete the delivery predictability received from the adjacent node from the delivery predictability database when the delivery predictability corresponding to the received next hop node matching the local node has already been registered with the delivery predictability database.

2. A node device comprising:
   a delivery predictability database configured to registers a delivery predictability for a destination node calculated in a local node and a delivery predictability received from an adjacent node therein;
   a delivery predictability calculation unit configured to calculate delivery predictabilities for the destination node and which registers the delivery predictability for the destination node calculated in the local node with the delivery predictability database;
   a delivery predictability exchange unit configured to transmit to the adjacent node the delivery predictability for the destination node calculated in the local node together with a next hop node in a path toward the destination node and which receives from the adjacent node the delivery predictability for the destination node calculated in the adjacent node together with a next hop node in the path toward the destination node;
   a delivery predictability reception decision unit configured to make a decision as to whether or not the next hop node received from the adjacent node matches the local node, wherein the received delivery predictability form the adjacent node is registered with the delivery predictability database when the next hop node received from the adjacent node does not match the local node, while the received delivery predictability from the adjacent node is not registered with the delivery predictability database when the next hop node received from the adjacent node matches the local node; and
   a path calculation unit configured to calculate the path toward the destination node with reference to the delivery predictability database storing the delivery predictability for the destination node calculated in the local node and the delivery predictability received from the adjacent node,
   wherein the delivery predictability reception decision unit is configured to delete the delivery predictability received from the adjacent node from the delivery predictability database when the delivery predictability corresponding to the received next hop node matching the local node has already been registered with the delivery predictability database.

3. A routing method which determines a path for transmitting data to a destination node based on delivery predictabilities for the destination node calculated in a local node and an adjacent node, said routing method implemented by a local node comprising:
   calculating the delivery predictability for the destination node, subsequently registering the delivery predictability for the destination node calculated in the local node with a delivery predictability database while transmitting to the adjacent node the delivery predictability for the destination node calculated in the local node together with a next hop node in a path toward the destination node;
   receiving the delivery predictability for the destination node calculated in the adjacent node together with a next hop node in the path toward the destination node, subsequently making a decision as to whether or not the next hop node received from the adjacent node matches the local node, wherein the received delivery predictability from the adjacent node is registered with the delivery predictability database when the next hop node received from the adjacent node does not match the local node, while the received delivery predictability from the adjacent node is not registered with the delivery predictability database when the next hop node received from the adjacent node matches the local node;

calculating the path toward the destination node with reference to the delivery predictability database storing the delivery predictability for the destination node calculated in the local node and the delivery predictability received from the adjacent node, and deleting the registered delivery predictability received from the adjacent node when the delivery predictability corresponding to the received next hop node matching the local node has already been registered with the delivery predictability database.

* * * * *